United States Patent
Kawai (10) Patent No.: US 6,304,064 B1
(45) Date of Patent: Oct. 16, 2001

(54) POWER SUPPLY DEVICE, POWER SUPPLY METHOD AND ELECTRONIC EQUIPMENT

(75) Inventor: Eiji Kawai, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/407,694

(22) Filed: Sep. 28, 1999

(30) Foreign Application Priority Data

Sep. 28, 1998 (JP) ................................. P10-273609

(51) Int. Cl.[7] .................. H02J 7/04; H02J 7/00
(52) U.S. Cl. ...................... 320/135; 320/112; 307/150
(58) Field of Search ..................... 320/112, 135; 307/150

(56) References Cited

U.S. PATENT DOCUMENTS

| | | |
|---|---|---|
| 4,970,451 | 11/1990 | Suomalainen . |
| 5,652,499 * | 7/1997 | Morita et al. .................. 320/112 |
| 5,656,876 * | 8/1997 | Radley et al. .................. 301/150 |
| 5,990,664 * | 11/1999 | Rahman ........................ 320/136 |

FOREIGN PATENT DOCUMENTS

| | | |
|---|---|---|
| 0788177 A1 | 8/1977 | (EP) . |
| 9-149631 | 6/1997 | (JP) . |

OTHER PUBLICATIONS

Rudolf F. Graf, "Modern Dictionary of Electronics", 1992, pp. 844.*

* cited by examiner

Primary Examiner—Gregory J. Toatley, Jr.
(74) Attorney, Agent, or Firm—Helfgott & Karas, P.C.

(57) ABSTRACT

It is an object of the present invention to provide a power supply device that is able to be used even when power is supplied to electronic circuits using secondary batteries of nickel-cadmium batteries and nickel-hydrogen batteries or the like whose recharging capacities are lowered, wherein original performance of the secondary battery can be maintained. A power supply circuit according to the present invention includes a connector which is electrically connected to a secondary battery which is a storage, a voltage step-up circuit that steps up an output voltage from the secondary battery, and a power supply line for supplying the stepped-up output voltage to an electronic circuit.

13 Claims, 5 Drawing Sheets

POWER SUPPLY DEVICE, POWER SUPPLY METHOD AND ELECTRONIC EQUIPMENT

BACKGROUND OF THE INVENTION

1. Field of the Invention

The present invention relates to a power supply device for and a power supply method of supplying power to electronic circuits by a battery, and electronic equipment provided with various electronic circuits, and a battery that supplies power to the electronic circuits, and specifically to a power supply device, a power supply method and electronic equipment wherein power is supplied to electronic circuits from a battery with decreased recharging capacity.

2. Background of the Invention

Typically, electronic equipment consists of electronic circuits that are driven by a battery or other power supply means. For example, portable electronic equipment, e.g. portable terminals, are driven by a primary battery or a rechargeable secondary battery.

Secondary batteries include nickel-cadmium batteries, nickel-hydrogen batteries and the like, and these nickel-cadmium batteries and nickel-hydrogen batteries have the advantages of a long history of practical use, high safety and low cost. Because of this, secondary batteries of nickel-cadmium batteries and nickel-hydrogen batteries have been used conventionally for driving electronic equipment.

However, nickel-cadmium batteries and nickel-hydrogen batteries have a disadvantage in that the so-called memory effect wherein voltage drops occur depending on their method of usage. The memory effect is an effect wherein the recharging capacity drops, a phenomenon that occurs for example when a deep discharge is performed after repeated shallow charging and discharging cycles, and then the voltage after discharge drops in two stages.

Figure 1:
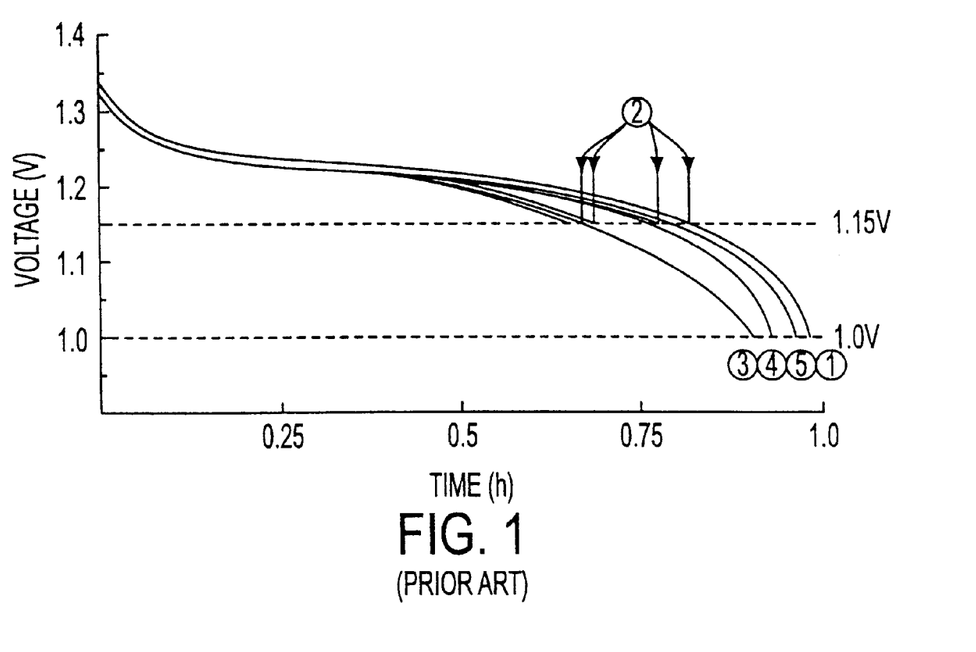
FIG. 1 is a graph used to explain the memory effect of nickel-based batteries.

To explain this more specifically, the memory effect occurs particularly in sealed nickel-cadmium batteries or the like, when cycles of shallow discharging(discharging that ends before the capacity is completely regained) and recharging are repeated, the capacity is lost, leading to reversible deterioration. For example, as shown in FIG. 1, if cycles of partially discharging and recharging a battery are performed repeatedly, the voltage and capacity that can be obtained drop gradually with the number of cycles (curve 2 shows repeated cycles). If the battery is completely discharged thereafter (curve 3), the discharge voltage drops compared to the initial characteristic obtained when the battery was discharged adequately (curve 1). The discharge profile shows a two-stage change, and the battery does not regain its original capacity even when discharged to the original end voltage.

This phenomenon is known as "voltage depression." Sometimes the battery may appear to remember the low capacity at the time of a shallow discharge, so it is also called the "memory effect." This type of loss is accelerated as the temperature becomes higher.

The drop in capacity due to such a memory effect is different from substantial deterioration in that the original state can be restored by performing several complete discharge/recharge reconditioning cycles.

Therefore, as countermeasures against the memory effect, usage warnings to the effect that shallow charging and discharging should not be repeated are posted on products, and mechanisms are provided which occasionally perform deep discharges (to the completely discharged state) and return the battery to its initial state. However, each of these countermeasures is inconvenient for the user.

In addition, with the appearance of secondary batteries made of new materials, namely lithium ion batteries and lithium polymer batteries and the like, these batteries do not have the disadvantage of the memory effect seen in nickel-cadmium batteries and nickel-hydrogen batteries because they do not use the nickel anode said to be the main cause of the memory effect. However, these secondary batteries made of new materials do not have a long history of practical use, their safety is not adequately established, and additional circuitry is required for these countermeasures, and thus they have many disadvantageous aspects such as packaging aspects and cost aspects. In addition, there is an additional problem in that the cost of the cells themselves is higher than that of the conventional nickel-cadmium batteries and nickel-hydrogen batteries.

SUMMARY OF THE INVENTION

It is an object of the present invention to avoid the above disadvantages and provide a power supply device, a power supply method and electronic equipment that can be used even when power is supplied to electronic circuits using secondary batteries of nickel-cadmium batteries and nickel-hydrogen batteries or the like whose recharging capacities are operated, wherein the original performance of these secondary batteries can be maintained.

In order to solve the aforementioned problems and attain at the above object the power supply device according to the present invention comprises a voltage step-up means that steps up the output voltage from the storage means, and a supply means that supplies the stepped-up output voltage to the electronic circuit.

A power supply device having such a configuration supplies the output voltage from the storage means stepped up by the voltage step-up means to the electronic circuit by means of the supply means.

Thereby, with the power supply device of this invention, even in the case in which the memory effect occurs in the storage means, it is possible to obtain a discharge time close to the normal discharge time for an electronic circuit with a fixed voltage required for operation.

Moreover, in order to solve the aforementioned problems, in the power supply method according to the present invention the output voltage from a storage means with decreased recharging capacity is stepped up and this stepped-up output voltage is supplied as output to an electronic circuit.

Thereby, with the power supply method of the invention, even in the case in which the memory effect occurs in the storage means, it is possible to obtain a discharge time close to the normal discharge time for an electronic circuit with a fixed voltage required for operation.

In addition, in order to solve the aforementioned problems, the electronic equipment according to the present invention comprises a voltage step-up means that steps up the output voltage from a storage means with decreased recharging capacity, and an electronic circuit that is operated by the stepped-up output voltage.

Electronic equipment having such a configuration operates the electronic circuit by means of the output voltage from the storage means stepped up by the voltage step-up means.

Thereby, with this electronic equipment, even in the case in which the memory effect occurs in the storage means, it is possible to obtain a discharge time close to the normal discharge time for an electronic circuit with a fixed voltage required for operation.

In addition, the power supply circuit according to the present invention comprises at least one storage battery that has the memory effect, and a voltage step-up circuit that steps up the output voltage from the storage battery and supplies power to an electronic circuit, and is characterized in that the voltage step-up circuit has characteristics such that the tolerances of its input specifications are relatively wide compared to the tolerances of its output specifications.

Thereby, since the tolerances of the input specifications of the voltage step-up circuit are relatively wide compared to the tolerances of its output specifications, even if a voltage drop due to the memory effect occurs in the storage battery, the minimum operable voltage of the electronic circuit can be maintained until the output voltage of the storage battery deteriorates to the lower-limit value of the input specifications. As a result, battery life is extended dramatically and the memory effect can be essentially eliminated.

DETAILED DESCRIPTION OF THE PREFERRED EMBODIMENTS

Here follows a detailed explanation of an embodiment of the present invention made with reference to the appended drawings. This embodiment shows a power supply device of the present invention applied to a power supply circuit used to drive an electronic circuit that constitutes electronic equipment or the like. Moreover, the power supply circuit which is this embodiment supplies power to electronic circuits from secondary batteries which are a storage means whose recharging capacity is reduced due to the so-called memory effect.

Figure 2:
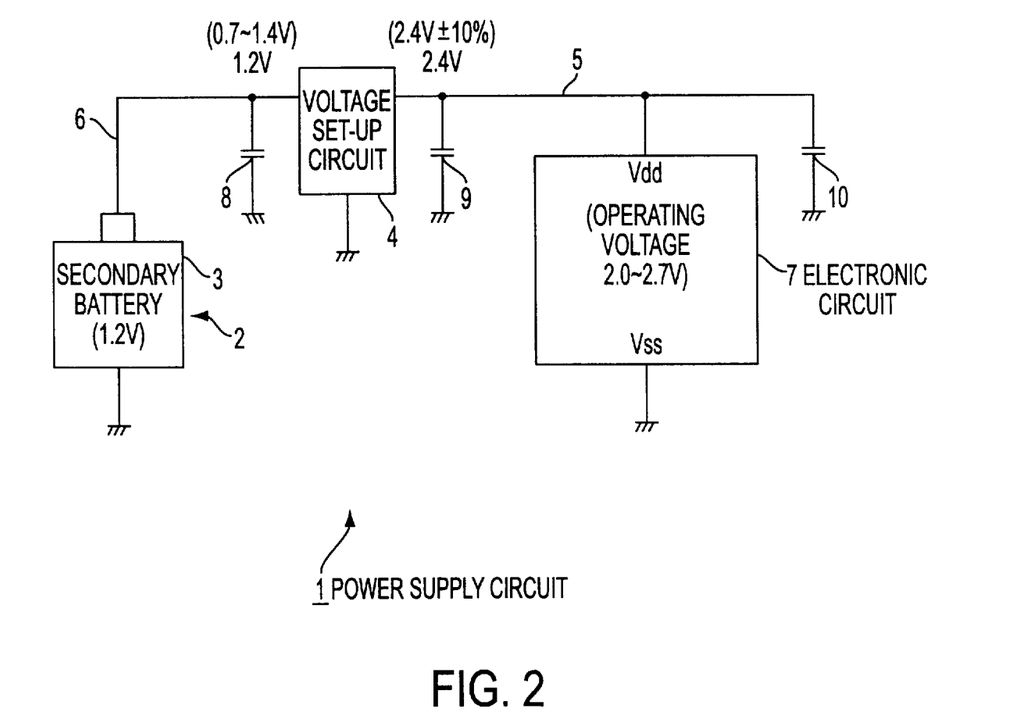
FIG. 2 is a block diagram showing the configuration of the power supply circuit of an embodiment of the present invention.

As shown in FIG. 2, the power supply circuit comprises a connector 2 which is a connection means that is electrically connected to the power supply circuit and into which is inserted a secondary battery 3 which is the storage means, a voltage step-up circuit 4 that steps up the output voltage from the secondary battery 3, and a power supply line 5 which is the supply means for supplying the stepped-up output voltage to an electronic circuit 7.

In addition, the power supply circuit 1 also comprises a power supply line 6 that electrically connects the connector 2 into which is inserted the secondary battery 3 to the voltage step-up circuit 4, along with capacitors 8, 9 and 10 connected to the power supply lines 5 and 6.

Here, the secondary battery 3 is a secondary battery whose charging capacity is reduced due to the memory effect. This secondary battery 3 may be a nickel-cadmium battery, for example. In addition, the secondary battery 3 may also be a nickel-hydrogen battery. The standard voltage of this secondary battery 3 is 1.2 V in this example. Here follows a description of the constituent components of the power supply circuit 1 which supplies power to the electronic circuit 7 with such a secondary battery 3 inserted.

The connector 2 is configured such that the secondary battery 3 is removable. By installing the secondary battery 3 in this connector 2, an electrical connection to the power supply circuit 1 is made.

The voltage step-up circuit (also called a step-up regulator) 4 forms a step-up circuit that steps up the input voltage to a stipulated voltage. To wit, as long as the voltage of the secondary battery 3 is within the input specification range, the voltage step-up circuit 4 steps up that voltage and supplies it to the electronic circuit 7 at the voltage according to the stipulated output specifications. Specifically, in accordance with the specifications of the electronic circuit 7, the voltage step-up circuit 4 steps up the output voltage from the secondary battery 3 to 2.4 V and supplies this voltage to the electronic circuit 7. In this example, the input specifications are set to the 0.7–1.4 V corresponding to the secondary battery 3 which has a standard voltage of 1.2 V. Note that this voltage step-up circuit 4 has a step-up accuracy of 2.4 V±10%.

The voltage step-up circuit 4 may be implemented as an IC (integrated circuit) if desired and is one that can be easily obtained commercially, for example, model S-8321/322 made by Seiko Instruments Inc. located in Chiba, Japan, model XC6361/6362 made by TOREX Semiconductor Ltd. located in Okayama, Japan, model LM2577 made by National Semiconductor Corporation located in U.S.A., products manufactured by Mitsumi Electric Co., Ltd., Fujitsu Electric Information Service, or the like. Moreover, examples of such a voltage step-up circuit 4 actually prepared with various input/output specifications are available on the market, so by preferably selecting such circuit depending on the circuit specifications, a wider degree of freedom in design can be secured.

As shown in FIG. 2, the voltage step-up circuit 4 is electrically connected to the connector 2 by means of the power supply line 6. Here, a capacitor 8 is connected to the power supply line 6 in order to remove radiofrequency noise.

Moreover, the voltage step-up circuit 4 supplies the electronic circuit 7 with a voltage (the voltage applied between $V_{dd}$ and $V_{ss}$ of the electronic circuit 7).

The electronic circuit 7 consists primarily of integrated circuits, and may be a microcomputer consisting of memory, CPU core, peripheral circuits and the like, for example. The microcomputer may be an electronic circuit that constitutes the controller for electronic equipment, for example.

The electronic circuit 7 has stipulated specifications for its operating voltage, 2.0–2.7 V in this example. The normal operation is not guaranteed unless the voltage supplied to this electronic circuit 7 is 2.0 V. This is an electronic circuit wherein the minimum operable voltage required for operation (hereinafter called the "minimum operating voltage") is 2.0 V or more.

The electronic circuit 7 is electrically connected to the connector 2 by means of power supply line 5. Here, capacitors 9 and 10 are connected to the power supply line 5 in order to remove radiofrequency noise. Capacitor 9 is for the voltage step-up circuit 4 while capacitor 10 is for the electronic circuit 7.

By power supply circuit 1 provided with the above-described components, the electronic circuit 7 can be operated without being affected by the memory effect of the secondary battery 3. Thereby, even if the memory effect should occur in the secondary battery 3, the power supply circuit 1 can operate the electronic circuit 7 for roughly the same amount of time as the time for a normal discharge.

Figure 3:
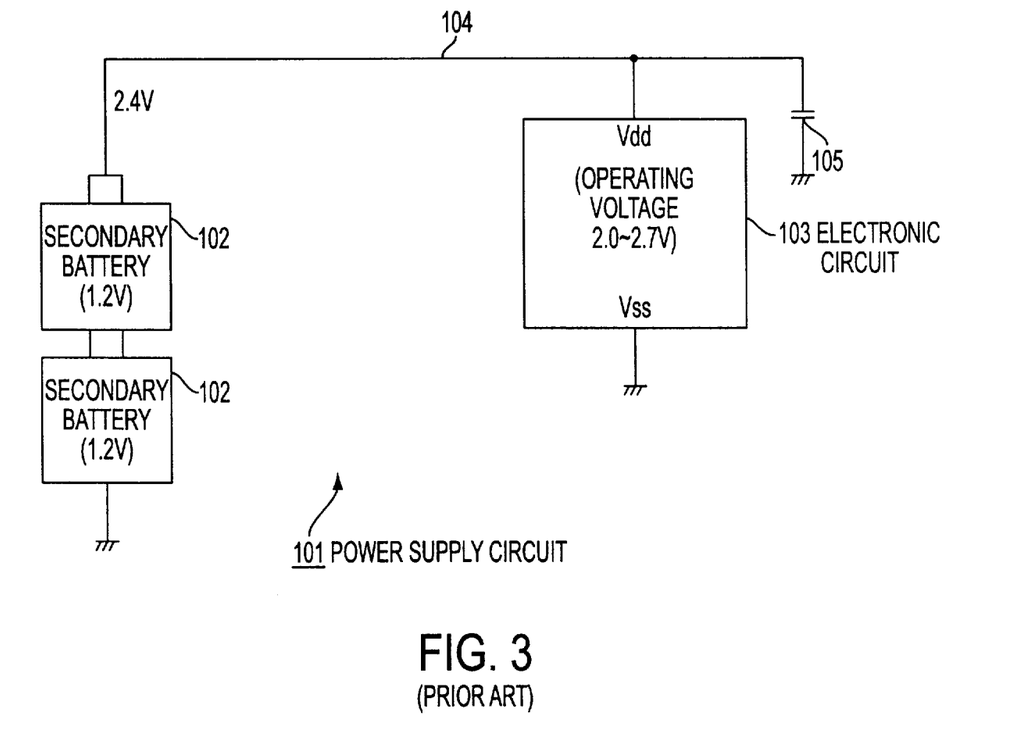
FIG. 3 is a block diagram showing the configuration of a typical power supply circuit used in order to explain the present invention.
Figure 4:
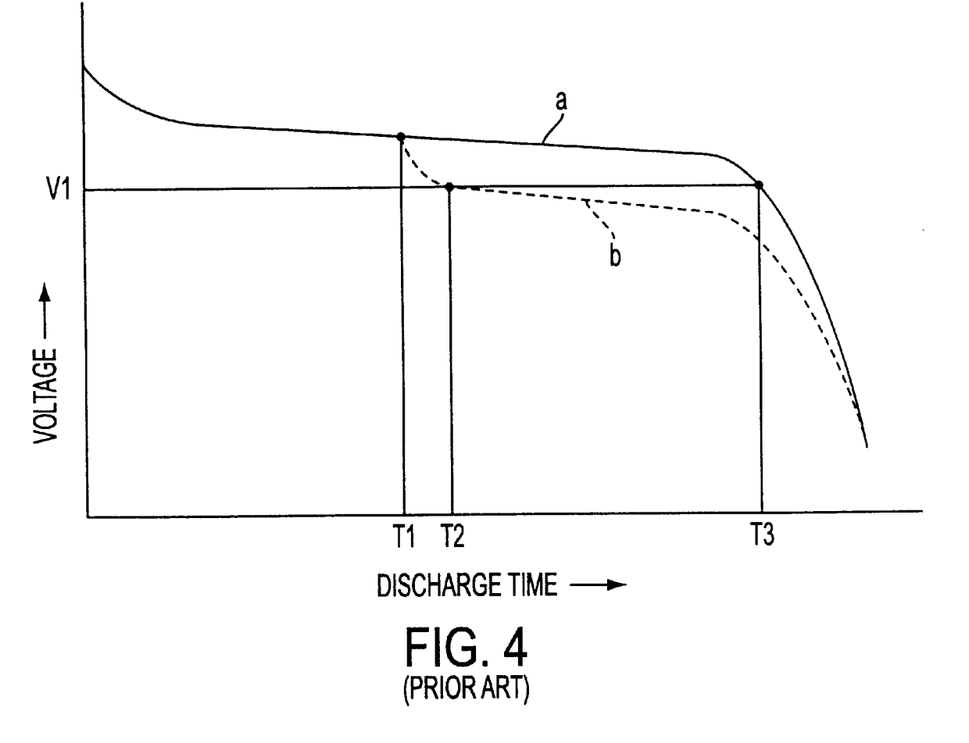
FIG. 4 is a characteristic graph showing the discharge characteristic of the typical power supply circuit described above.

Here follows an explanation of the detailed operation of power supply circuit 1, but first, in order for this embodiment to be easily understood, we will use FIG. 3 and FIG. 4 to explain briefly the characteristics of operation in the case in which the memory effect occurs.

FIG. 3 shows an example of a typical power supply circuit 101 without a voltage step-up circuit. As shown in this FIG. 3, the power supply circuit 101 comprises two secondary batteries 102 which is a power supply means, an electronic circuit 103, a power supply line 104 that supplies power to the electronic circuit 103 from the secondary batteries 102 and a capacitor 105 connected to the power supply line 104.

Here, the electronic circuit 103 may be an integrated circuit like the electronic circuit 7 described above. In addition, the electronic circuit 103 has an operating voltage of 2.0–2.7 V like the electronic circuit 7 described above.

The secondary batteries 102 are nickel-cadmium batteries and as such are secondary batteries wherein the memory effect occurs as described above. Here, the standard voltage of each of the secondary batteries 102 is 1.2 V, so by connecting two secondary batteries 102 in series, the voltage output is 2.4 V under standard conditions.

Moreover, in the power supply circuit 101, the electronic circuit 103 and the two secondary batteries 102 are connected by means of the power supply line 104. Here, a capacitor 105 is connected to the power supply line 104 in order to remove radiofrequency noise.

In a typical power supply circuit 101 having the above arrangement, a standard voltage of 2.4 V is applied to the electronic circuit 103 which has a guaranteed operating range of 2.0–2.7 V. In such a power supply circuit 101, as discharging naturally proceeds through the consumption of current by the electronic circuit 103, the system's discharge stop point is set to the point when 2.0 V, the minimum operating voltage of this electronic circuit 103, is reached.

FIG. 4 shows a specific example of the discharge characteristic of the power supply circuit 101 due to the consumption of current by this typical electronic circuit 103. In this FIG. 4, the vertical axis shows the value of the voltage output from the battery (hereinafter called the "supply voltage") and the horizontal axis shows the discharge time. Moreover, in FIG. 4, curve a indicated by the solid line shows the change in the supply voltage from the two secondary batteries 102, 102 when discharged normally, while curve b indicated by the broken line shows the change in the supply voltage when discharged from the state in which the memory effect has occurred. In order to explain the memory effect in an easily understood manner, curve b is drawn in a slightly exaggerated manner illustrating a state in which many cycles of shallow discharging and recharging are repeated.

As shown in curve a of FIG. 4, the supply voltage when discharged normally exhibits a trend in which a temporary drop is seen at the start of the discharge, followed by a gradual decrease thereafter and then a sudden drop is seen. Moreover, in the interval wherein the supply voltage drops rapidly, the voltage V1 which is the voltage of the discharge stop point is reached at the time of the discharge time T3.

Note that here, while it is possible to extend the discharge time by lowering the lower operating limit of the electronic circuit 103, namely lowering the minimum operating voltage, since the discharge curve drops rapidly after the discharge time T3, this cannot be said to lead to a substantial increase in the life of the secondary batteries 102, 102.

Next, we shall explain the discharge time in the case in which the memory effect occurs, shown in curve b. The memory effect is a phenomenon that occurs after shallow discharging and recharging is repeated and then deep discharging is performed, so it is a phenomenon in which the voltage at the time of discharge shows a two-stage drop. If we explain this in the case of no voltage step-up circuit as in FIG. 4, this is a phenomenon in which a drop in voltage occurs when discharging for example to the discharge time T1 and recharging is performed repeatedly. The discharge characteristic in the case that discharging of the secondary battery is continued in the state in which this memory effect has occurred, as shown by the broken line in FIG. 4, shows that the supply voltage drops rapidly (e.g., a drop of roughly several dozen mV) from near the discharge time T1 and then decreases in the same manner as a discharge in the normal case and then becomes nearly identical to that of the normal case at the final low battery point (time of complete discharge). In this manner, the discharge characteristic of a battery in which the memory effect has occurred, although exhibiting a rapid voltage drop due to the memory effect, thereafter qualitatively agrees roughly with the discharge characteristic in the case of a normal discharge.

In this example, since the supply voltage drops rapidly due to the memory effect, the supply voltage immediately thereafter reaches the voltage V1 which is the discharge top point of the electronic circuit, so the discharge time T2 is shorter than the discharge time T3 described above, thus indicating the case in which the battery life is much shorter than the case in which the supply voltage is reduced due to a normal discharge.

Here, while the battery life could be improved by decreasing the lower operating limit voltage of the electronic circuit 103, the lower-limit voltage of a typical electronic circuit is set to an optimal value determined by various factors including the semiconductor process, operating speed, circuit characteristics and the like, so it is not easily decreased significantly. The above is a description of the discharge characteristic of a power supply circuit in the case in which it is not equipped with a voltage step-up circuit.

Figure 5:
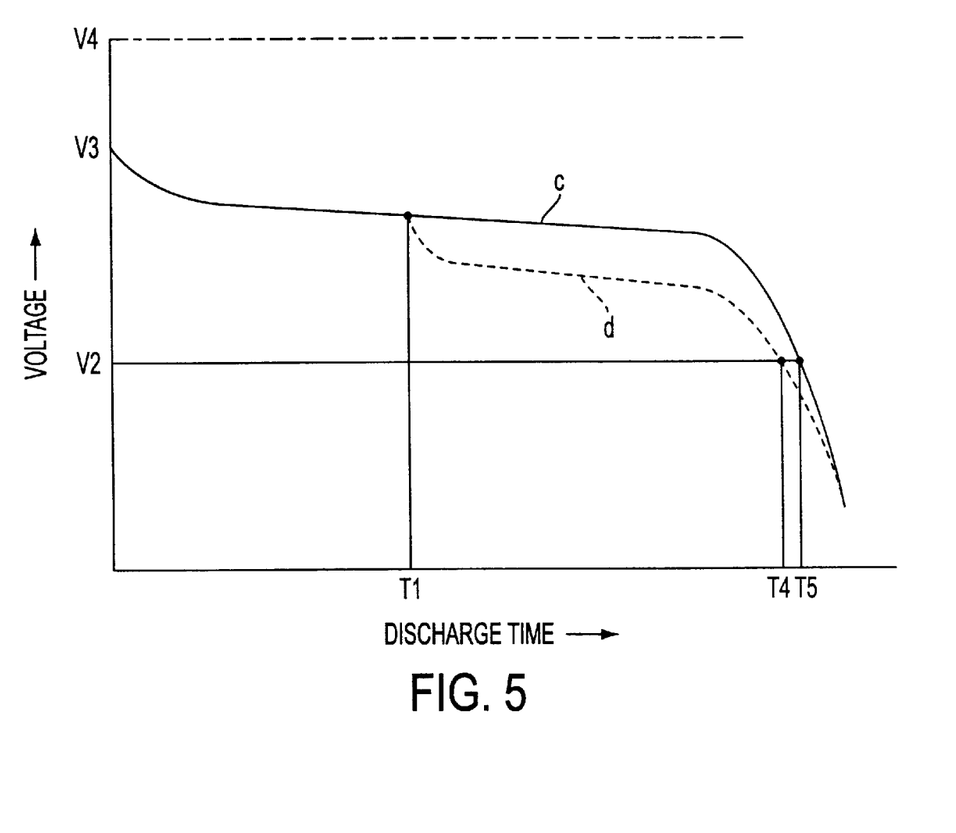
FIG. 5 is a characteristic graph showing the discharge characteristic of the power supply circuit which is the embodiment of the present invention described above.

Here follows an explanation of the discharge characteristic of the power supply circuit 1 to which the present invention is applied, using FIG. 5. In this FIG. 5, the vertical axis shows the voltage value and the horizontal axis shows the discharge time. In addition, in FIG. 5, curve c indicated by the solid line shows the change in the supply voltage from the secondary battery 3 when discharged normally, while curve d indicated by the broken line shows the change in the supply voltage from the secondary battery 3 when discharged from the state in which the memory effect has occurred. Moreover, the voltage range V2–V3 corresponds to the input specifications of the voltage step-up circuit 4. To wit, as long as the supply voltage value from the secondary battery 3 is within the input specifications in the voltage value range V2–V3, it is stepped up to the voltage V4 (the double broken line shown in FIG. 5) so the electronic circuit 7 will operate normally. Specifically, in the power supply circuit 1, since the minimum voltage of the input specifications of the voltage step-up circuit 4 is 0.7 V, substantially the electronic circuit 7 can be operated normally until the battery voltage drops to the lower-limit voltage value of 0.7 V.

As a result, one can see that even during a discharge in which the memory effect is still occurring, the discharge time T4 at which the battery voltage reaches the lower-limit voltage value of 0.7 V is dramatically longer than the time T2 shown on FIG. 3 which is when [the battery voltage]

reaches 2.0 V, the minimum operating voltage of the electronic circuit 103 in the typical power supply circuit 101.

Moreover, even if we compare the discharge time T5 when the battery voltage reaches 0.7 V which is the lower-limit voltage value when a normal discharge is performed is compared with the discharge time T4 when the battery voltage reaches 0.7 V which is the lower-limit voltage value when a discharge is performed when during a discharge in which the memory effect is still occurring, the discharge time T4 in the case in which the memory effect is occurring approaches the discharge time T5 in the case of a normal discharge.

By equipping the power supply circuit 1 with a voltage step-up circuit 4, even if the lower-limit voltage of the electronic circuit 7 itself is left unchanged at 2.0 V, it is possible to extend the discharge time of the secondary battery 3 in which the memory effect has occurred, and moreover, the discharge time can be made to be nearly the same value as the discharge time in the normal case.

As described above, by applying the present invention, the power supply circuit 1 can be used without worrying about the memory effect. Thereby, the power supply circuit 1 can improve the usefulness of safe and inexpensive nickel-based secondary batteries. In addition, if the memory effect occurs, the equipment itself may make a "battery low" judgment so it consumes no more current. In the case in which the memory effect occurs, the battery can be restored to the normal state by completely discharging the battery, but the equipment itself does not operate so the battery cannot be discharged completely, thus requiring a means of returning the discharge characteristic of the battery to normal. Such means of returning the discharge characteristic of the battery to normal may include requiring a corresponding mechanism on the battery charger or another piece of equipment.

However, as explained using FIG. 5, the power supply circuit 1 to which the present invention is applied can be discharged to near the low battery point, or discharged nearly completely, and thus the convenience to the user can be improved. To wit, the power supply circuit 1 can improve convenience by allowing the battery to be returned to the initial state through normal use even once the memory effect has occurred.

To understand the present invention from a different standpoint, as shown in FIG. 2, the standard voltage of 1.2 V of the secondary battery 3 is stepped up by the voltage step-up circuit 4 and applied to the electronic circuit 7. At this time, the voltage step-up circuit 4 may have input specifications of a nominal value of 1.2 V, and tolerances of −0.5 V and +0.2 V, and output specifications of a nominal value of 2.4 V, and tolerances of ±10%. To be more specific, by adopting as the voltage step-up circuit 4 a step-up circuit that can achieve input specifications in a loose (wide) range of a nominal value of 1.2 V and tolerances of +17% and −42% and output specifications of a strict (narrow) range of a nominal value of 24 V and tolerances of ±10%, its characteristics can be used skillfully. As a result, even if the output voltage of the secondary battery 3 degrades by −0.7 V, the output voltage of the voltage step-up circuit 4 is kept up to at least 2.16 V which is 2.4 V-10%, and this output voltage can satisfy the minimum operating voltage of the electronic circuit 103 which is 2.0 V.

In this manner, the present invention has at least one secondary battery that may have the memory effect and a voltage step-up circuit that steps up the output voltage of said secondary battery and supplies it to the electronic circuit, and the voltage step-up circuit is characterized in that the tolerances of its input specifications are relatively wide compared to the tolerances of its output specifications.

In this case, if desired, a plurality of voltage step-up circuits can be connected in series or connected in parallel, or connected in series-parallel to give a multi-stage constitution.

In addition, there are many inexpensive voltage step-up circuits available that are implemented as an IC and have various input and output voltage specifications, so by selecting these appropriately, it is possible to design the battery configuration with a wide degree of freedom with respect to the number of secondary batteries and whether they are connected in series or in parallel. To wit, the power supply circuit 1 can improve the degree of freedom in the selection and configuration of secondary batteries depending on the selection of the voltage step-up circuits.

In addition, the power supply circuit 1 permits the existing secondary batteries to be used, so it is possible to shorten the development period for equipment and also reduce the development risk.

Note that the power supply circuit 1 according to the present invention is provided with only one secondary battery with a standard voltage of 1.2 V, but two batteries may also be connected in series or two or more batteries can also be connected in parallel.

Note that the power supply circuit 1 which is an embodiment of the present invention was explained as having the secondary battery 3 be removable, but it can also be provided with a permanently installed secondary battery that does not need to be removed. In addition, the power supply circuit 1 which operates electronic circuit 7 of electronic equipment was explained as an embodiment of the present invention, but this is not a limitation. The electronic equipment itself equipped with the electronic circuit 7 may be provided with the constitution of power supply circuit 1, or namely the voltage step-up circuit 4, and thereby, the output voltage of the secondary battery 3 may be stepped up and supplied to its own electronic circuit 7.

With the power supply device according to the present invention, by providing a voltage step-up means that steps up the output voltage from the storage means and a supply means that supplies the stepped-up output voltage to the electronic circuit, the output voltage from the storage means stepped-up by the voltage step-up means can be supplied to the electronic circuit by the supply means.

Thereby, with this power supply device, even in the case in which the memory effect occurs in the storage means, it is possible to obtain a discharge time close to the normal discharge time for an electronic circuit with a fixed voltage required for operation.

In addition, the power supply device can improve convenience by allowing the storage means to be returned to the initial state through normal use even once the memory effect has occurred.

In addition, in the power supply method according to the present invention, by stepping up the output voltage from a storage means with decreased recharging capacity and providing this stepped-up output voltage as output to the electronic circuit, even in the case in which the memory effect occurs in the storage means, it is possible to obtain a discharge time for this storage means close to the normal discharge time for an electronic circuit with a fixed voltage required for operation.

By means of the power supply method according to the present invention, the power supply device can improve convenience by allowing the storage means to be returned to the initial state through normal use even once the memory effect has occurred.

In addition, in the electronic equipment according to the present invention, in order to solve the aforementioned problem, by providing a voltage step-up means that steps up the output voltage from a storage means with decreased recharging capacity and an electronic circuit that is operated by the stepped-up output voltage, the electronic circuit can be operated by the output voltage from the storage means stepped up by the voltage step-up.

Thereby, with this electronic equipment, even in the case in which the memory effect occurs in the storage means, it is possible to obtain a discharge time close to the normal discharge time for an electronic circuit with a fixed voltage required for operation.

In addition, the electronic equipment can improve convenience by allowing the storage means to be returned to the initial state through normal use even once the memory effect has occurred.

What is claimed is:

1. A power supply device that supplies power to an electronic circuit from a storage means with decreased recharging capacity, comprising:

a voltage step-up means that steps up an output voltage from said storage means so that the minimum operating voltage can be supplied to the electronic circuit when the lower-limit voltage is output from the storage means, thereby allowing the storage means to be discharged nearly completely; and a supply means that supplies said stepped-up output voltage to said electronic circuit.

2. The power supply device recited in claim 1, wherein a the recharging capacity of said storage means is decreased due to a memory effect.

3. The power supply device recited in claim 1, wherein said storage means is a nickel-based secondary battery.

4. The power supply device recited in claim 1, wherein said electronic circuit has a fixed minimum operable voltage required for operation.

5. The power supply device recited in claim 1, further comprising a connection means whereby said storage means is removable, and said voltage step-up means steps up said output voltage provided as an output via said connection means.

6. Electronic equipment comprising:

a voltage step-up means that steps up an output voltage from a storage means with decreased recharging capacity, wherein the minimum operating voltage can be supplied to the electronic circuit when the lower-limit voltage is output from the storage means, thereby allowing the storage means to be discharged nearly completely; and an electronic circuit that is operated by said stepped-up output voltage.

7. The electronic equipment recited in claim 6, wherein a recharging capacity of said storage means is decreased due to the memory effect.

8. The electronic equipment recited in claim 6, wherein said storage means is a nickel-based secondary battery.

9. The electronic equipment recited in claim 6, wherein said electronic circuit has a fixed minimum operable voltage required for operation.

10. The electronic equipment recited in claim 6, further comprising:

a connection means whereby said storage means is removable, and wherein said voltage step-up means steps up said output voltage provided as an output via said connection means.

11. A power supply circuit comprising:

at least one storage battery that has a memory effect; and a voltage step-up circuit that steps up an output voltage from said storage battery and supplies power to an electronic circuit, wherein the minimum operating voltage can be supplied to the electronic circuit when the lower-limit voltage is output from the storage means, thereby allowing the storage means to be discharged nearly completely.

12. The power supply circuit recited in claim 11, wherein said storage means is a nickel-based storage battery.

13. A power supply circuit comprising:

at least one storage battery that has a memory effect; and a plurality of voltage step-up circuits that step up an output voltage from said storage battery and supply power to an electronic circuit, wherein at least one of said voltage step-up circuits can supply the minimum operating voltage to the electronic circuit when the lower-limit voltage is output from the storage means, thereby allowing the storage means to be discharged nearly completely.

* * * * *